Patented Feb. 9, 1932

1,844,013

UNITED STATES PATENT OFFICE

ANGELO KNORR, OF BERLIN, AND ALBERT WEISSENBORN, OF POTSDAM, GERMANY, ASSIGNORS TO WINTHROP CHEMICAL COMPANY, INC., OF NEW YORK, N. Y., A CORPORATION OF NEW YORK

MANUFACTURE OF PARA-ISOPROPYL-ALPHA-METHYL HYDROCINNAMIC ALDEHYDE

No Drawing.     Application filed October 18, 1929. Serial No. 400,726.

Our present invention relates to a new aromatic aldehyde and more particularly to a compound which relates to the formula:

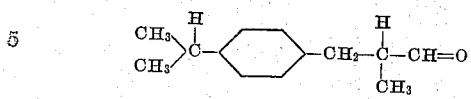

being para isopropyl-α-methyl-hydrocinnamic aldehyde and to a process of manufacturing it. A further object of our invention is to provide a new substance which is very valuable in perfumery.

This invention will best be understood from a consideration of the following detailed description; nevertheless, it is to be understood that the invention is not confined to the disclosure being susceptible of such changes and modifications which shall define no material departure from the salient features of the invention as expressed in the appended claims.

The first step in the process for manufacturing our new aldehyde consists in condensing cuminic aldehyde with propionic aldehyde. This process may be carried out in the following manner:

A solution of 10 parts of caustic potash in 400 parts of ethyl alcohol is mixed at a temperature of about 10° C. with 200 parts of cuminic aldehyde. Then in the course of 2 to 4 hours 60 parts of propionic aldehyde are added drop by drop at a temperature of about 10–15° C. After neutralization of the caustic potash with, for instance, carbon dioxide or acetic acid the alcohol is removed by distillation and the product of reaction is distilled in a vacuum. We obtain for instance 45 parts of unaltered cuminic aldehyde and 160 parts of para-isopropyl-α-methylcinnamic aldehyde having a boiling point of 152–158° C. under a pressure of 9 millimeters Hg. The aldehyde forms a yellow liquid having a spiced aromatic odor.

From this intermediate we now prepare the desired para-isopropyl-α-methylhydrocinnamic aldehyde by the following method.

100 parts of the condensation product of cuminic aldehyde and propionic aldehyde obtainable according to the process mentioned above are diluted with ethyl alcohol or benzene and treated after addition of a nickel catalyst, containing about 3 parts of nickel calculated on the quantity of the condensation product, with hydrogen under pressure at a temperature up to 100° C. The reaction is finished if such a quantity of hydrogen is consumed which is necessary to saturate the double linkage in the intermediate product. The product of reaction is distilled in a vacuum and 80 parts of para-isopropyl-α-methyl-hydrocinnamic aldehyde are thus obtained in a pure state.

The said aldehyde forms a colorless liquid which is easily soluble in the usual organic solvents. It boils at 133 to 137° C. at a pressure corresponding to 9 millimeters Hg. It shows the characteristic property of aldehydes of forming a crystalline compound with sodium bisulfite. Its specific gravity at a temperature of 15° C. is 0.962; it has a very intensive bloomy odor resembling cyclamen and may be used as an ingredient in the manufacture of perfumes.

What we claim is:—

1. As a new product the para-isopropyl-α-methyl-hydrocinnamic aldehyde of the formula:

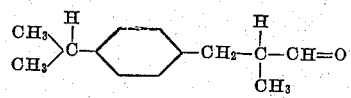

forming a colorless liquid having a boiling point of 133–137° C. at a pressure of 9 millimeters Hg and having the specific gravity 0.962 at a temperature of 15° C. having an intensive bloomy odor resembling cyclamen.

2. The process which comprises hydrogenating para-isopropyl-α-methylcinnamic aldehyde.

3. The process which comprises acting upon para-isopropyl-α-methylcinnamic aldehyde in the presence of a nickel catalyst under pressure at a temperature up to 100° C. with such a quantity of hydrogen necessary to saturate the double linkage in the starting material.

In testimony whereof, we affix our signatures.

ANGELO KNORR.
ALBERT WEISSENBORN.